United States Patent
Winkler et al.

[11] Patent Number: 6,028,280
[45] Date of Patent: Feb. 22, 2000

[54] ACTUATOR FOR GENERATING SWITCHING SIGNALS

[75] Inventors: Udo Winkler, Langen; Rainer Oberheim, Bensheim; Miodrag Mees, Schwetzingen, all of Germany

[73] Assignee: AEG Sensorsysteme GmbH, Weinheim, Germany

[21] Appl. No.: 09/045,690

[22] Filed: Mar. 23, 1998

[30] Foreign Application Priority Data

Mar. 22, 1997 [DE] Germany .................... 197 12 153

[51] Int. Cl.$^7$ .......................... H01H 19/62; H01H 43/10
[52] U.S. Cl. ................... 200/573; 200/19.03; 200/19.2; 200/338; 200/47
[58] Field of Search ................. 188/83, 85; 192/138, 192/139, 141, 142 R, 143, 150; 200/1 R, 1 V, 17 R, 19.01, 19.02, 19.03, 19.18, 19.2, 33 R, 33 B, 47, 500, 501, 573, 574

[56] References Cited

U.S. PATENT DOCUMENTS

| | | | |
|---|---|---|---|
| 3,720,295 | 3/1973 | Balz | 192/141 |
| 3,928,740 | 12/1975 | Alsch | 200/153 LB |
| 4,771,142 | 9/1988 | Spinner | 200/153 P |
| 4,962,290 | 10/1990 | Nelson et al. | 200/308 |
| 5,506,377 | 4/1996 | Hill et al. | 200/47 |

*Primary Examiner*—Michael Friedhofer
*Attorney, Agent, or Firm*—Dennison, Meserole, Scheiner & Schultz

[57] ABSTRACT

The invention relates to an actuator for operating a signal transmitter comprising a shaft rotatably mounted in a housing, a motor rotating the shaft to operate the signal transmitter as a function of position, a portion of the shaft having a first recess, a sleeve surrounding the shaft having a second recess, a ball element spring biased in one recess, the ball element operating the signal transmitter when the position of the first and second recess coincide.

9 Claims, 2 Drawing Sheets

ACTUATOR FOR GENERATING SWITCHING SIGNALS

FIELD OF THE INVENTION

The invention relates to an actuator for operating at least one signal transmitter, in particular an electromagnetic actuator for operating at least one switch, such as a microswitch, comprising a shaft, which can be rotated by means of a drive, such as a motor, and indirectly or directly operates the signal transmitter as a function of its own position.

BACKGROUND OF THE INVENTION

Such actuators are employed for switching, for example valves, slides, throttle flaps in fuel systems of aircraft and helicopters, or electrical elements. In this connection it is known to turn a shaft, which is provided with cams, by means of an electric motor via a worm gear shaft, such as gear wheels and planetary stages, wherein a vane acting on the microswitch is operated as a function of the position of the shaft. The vane can be designed as a strip of sheet metal. Within its range of operations, the actuator and its components are subjected to the most varied compatibility conditions, such as a lifting magnet, supply voltage, temperature and air pressure, as well as structural tolerances, so that for this reason a precise switching operation, i.e. one with a steep slope, cannot be realized.

Such an actuator is complicated in respect to assembly, since the exact positioning and shaping of the vane is required. Furthermore, because of the longitudinal extension of the vanes, there is a limitation regarding the number of switches which can be assigned to a shaft, or respectively the cams extending from it.

OBJECT AND SUMMARY OF THE INVENTION

It is the object of the instant invention to further develop an actuator of the type mentioned at the outset in such a way that an extremely precise operation of the signal transmitter, i.e. a switch with a steep characteristic curve, becomes possible. The elements used are to be of simple structure, wherein an extensive independence from the mentioned parameters in regard to the switching process to be performed should be provided. Assembly is also to be simplified.

This object is attained in accordance with the invention in that a first recess is provided in the shaft, that in the displacement path of the recess the shaft is surrounded by an envelope which has a second recess in the area of the at least one signal transmitter, that an actuator for the signal transmitter extends in the second recess, which can be operated either by a first element, which is radially displaceable in the first recess, or by second element, which can be brought into the first recess and is displaceable in the second recess. In this case the shaft preferably is enclosed in a sleeve or a section of such a sleeve constituting the envelope, in which the second recess extends radially, provided that the first element is arranged therein, radially displaceable by a force in the direction of the switch element.

The first element, charged by a force such as a spring, preferably is a ball or bolt element, so that a sliding transition is assured when moving over the edge areas of the second recess provided in the sleeve.

If the first recess, which extends radially in the shaft, is aligned with the second recess in the envelope, which recess also extends radially with respect to the shaft in the envelope, such as a sleeve, the first element, such as a spring-loaded ball, is pushed into areas of the second recess, by means of which a switching operation can be triggered, i.e. that the first element can actuate a switching member, such as a switching tappet, of the signal transmitter, such as a microswitch. By matching the ball diameter and the diameter in the second recess and therefore the possible stroke of the ball, it is possible to trigger a switching process in a very precise manner, i.e. the characteristic switching line extends extremely steeply.

A particularly simple construction results if a ball element is provided in the second recess extending in the envelope, on which a force acts in the direction of the shaft, indirectly if required, by means of the operating member of the signal transmitter. If the recess provided in the shaft is aligned with that of the sleeve, the ball element can move partially into the first recess, by means of which a switching process is triggered.

In this case the first recess preferably is a depression, V-shaped in cross section, which extends in the axial direction of the shaft.

Since neither switching vanes nor other elements, which are greatly dependent on variable compatibility conditions and structural tolerances, are required to trigger a switching process, it is assured that a change in the compatibility conditions and structural tolerances does not affect the switching process. Because of the matching of the cross sections of the recesses and of the elements which are displaceable in relation to the shaft, such as balls in particular, a precise adjustment of the stroke, and therefore reproducibility of the switching process, is furthermore possible. The assembly of the cooperating elements is simple, so that the actuator in accordance with the invention can be produced in a cost-effective manner. Maintenance and repairs are also possible without problems.

It has been provided in particular that at least two signal transmitters are arranged one behind the other, viewed in the axial direction of the shaft, wherein the signal transmitters can extend radially offset in respect to their respective switch member. It is possible by means of this to trigger several switching operations at short time intervals.

It is also possible to arrange several signal transmitters not only in the axial direction, but radially around the shaft. In this case preferably at least two signal transmitters are provided, which are offset by 90° in respect to each other in relation to the shaft, or respectively its axis.

Further details, advantages and characteristics of the invention ensue not only from the claims and the characteristics to be taken from them, individually and/or in combination, but also from the following description of preferred embodiments represented in the drawings.

DETAILED DESCRIPTION OF THE PREFERRED EMBODIMENTS

Figure 1:
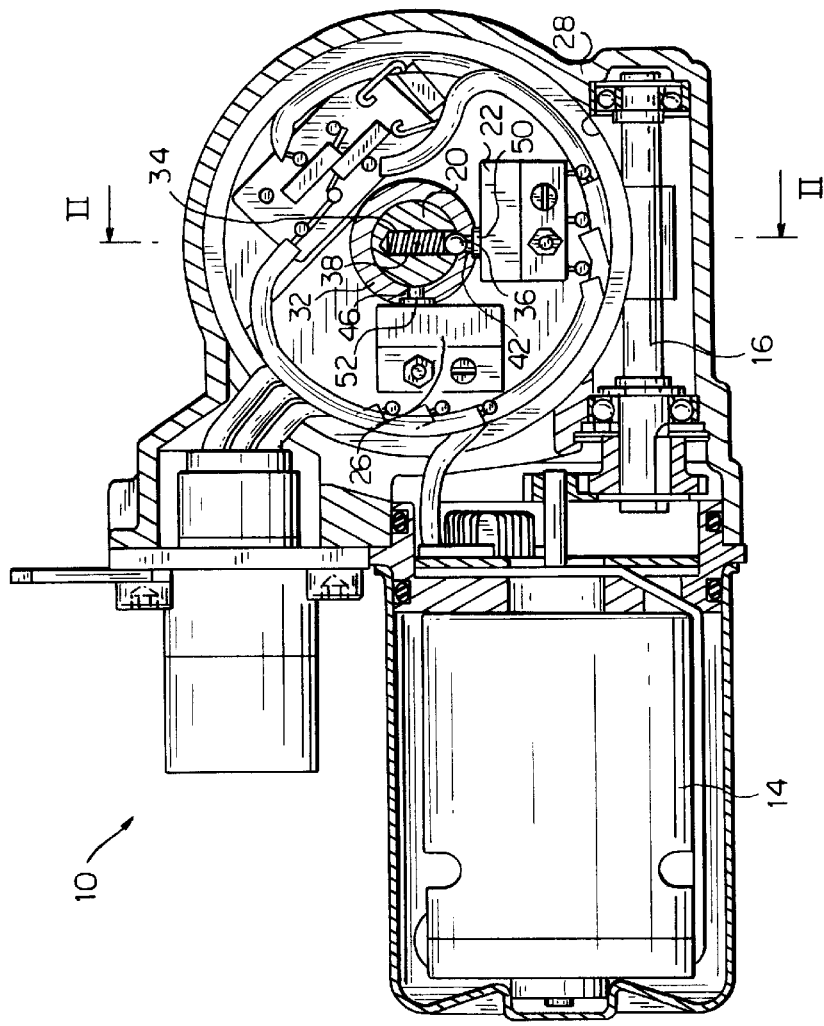
FIG. 1 represents a first embodiment of an actuator.

Preferred embodiments of electromechanical actuators 10, 12 are represented in the drawing figures, wherein basically like elements have been provided with like reference numerals, by means of which preferably valves are intended to be switched, however without this placing a limitation on the invention.

As is known in connection with electro-mechanical actuators, the actuators 10, 12 each include an electric motor 14, by means of which a worm gear shaft 16 can be turned which, in turn, by means of gear wheels and planetary stages, causes a shaft 18 with a portion 20 to be rotated. Switch elements 22, 24 and 26 are actuated in a manner described below.

Figure 3:
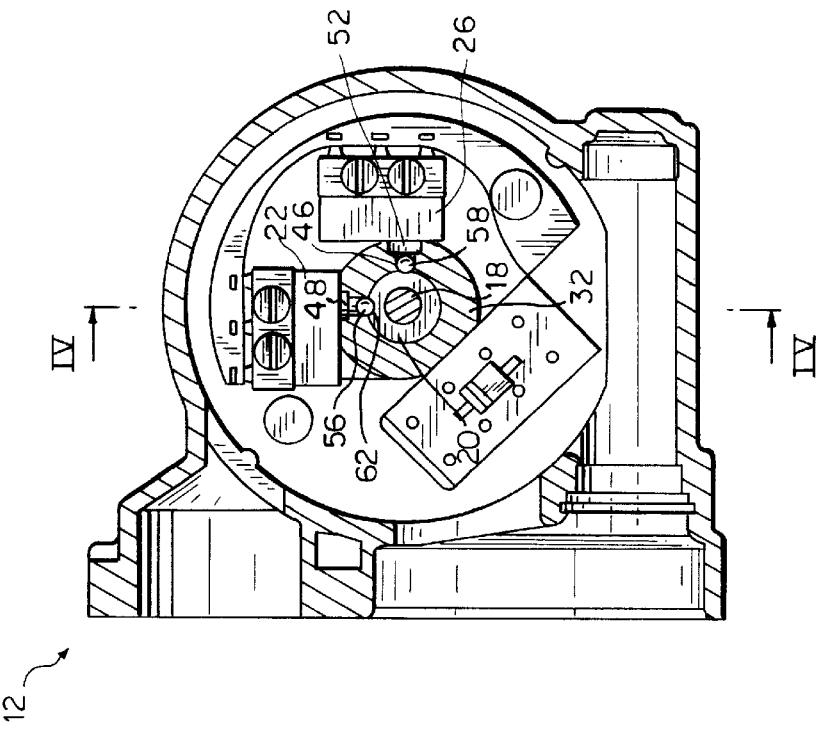
FIG. 3 shows a portion of a second embodiment of an actuator.

The portion 20 of the shaft 18 which conventionally is seated in a housing 28 of the actuator 10, is enclosed in a hollow-cylindrical or sleeve-like body 32, around which the switch elements 22, 24, 26 are peripherally attached by fasteners, as shown in FIGS. 1 and 3. The sleeve-like body extends from an intermediate wall 30 of the housing 28.

The portion 20 of the shaft 18 has a recess in the shape of a blind bore 34, in which a ball element 36 is arranged radially displaceable and biased outward by means of a spring element, such as the helical spring 38 in the direction of the sleeve 32.

In the exemplary embodiment, a plurality of switches are arranged one behind the other in relation to the shaft. To be actuated, two additional extending blind bores 34, 40 are provided on shaft portion 20, these are preferably arranged in parallel, but at least in two planes extending parallel with each other.

The hollow-cylindrical sleeve 32 (FIGS. 3, 4) forming part of the intermediate wall 30 itself has through-bores 42, 44, 46, into which the operable members 48, 50, 52 of the switches, such as the micro-switches 22, 24, 26, extend. These members are actuated by the ball elements 36 when the blind bores 34 or 40 are aligned with the appropriate bores 42, 44, 46. In this case, the ball elements 36 partially extend into the bores 42, 44, 46 in order to act on the operable members 48, 40, or 52 and to actuate the respective microswitch. The microswitches here each contain a spring element.

The respective operable member 48, 50, 52 of the switch elements can be actuated with a defined stroke as a function of the diameter of the respective ball element 36, or respectively the effective penetration depth of the balls 36 into the respective bores 42, 44, 46 of the sleeve 32, so that a desired characteristic switching line results.

Figure 2:
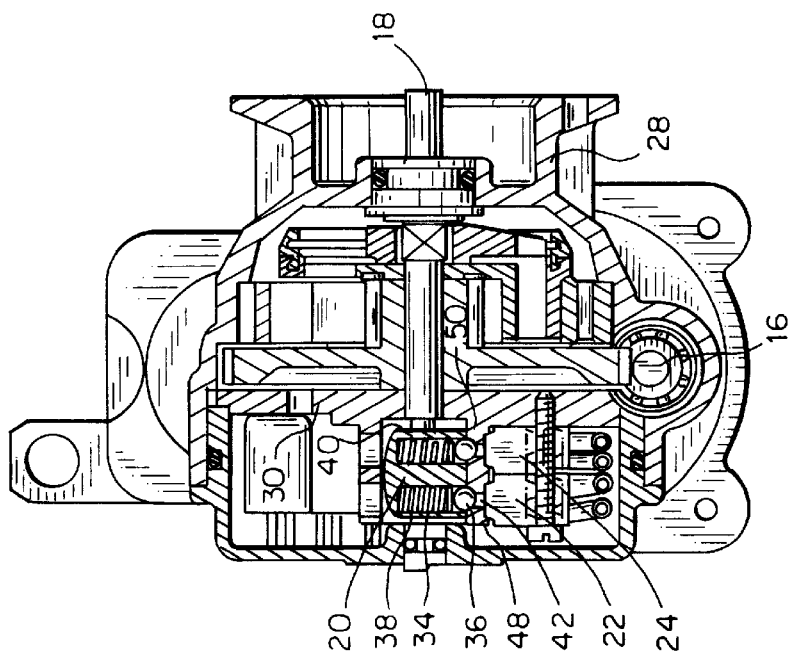
FIG. 2 is a section along the line II—II in FIG. 1.
Figure 4:
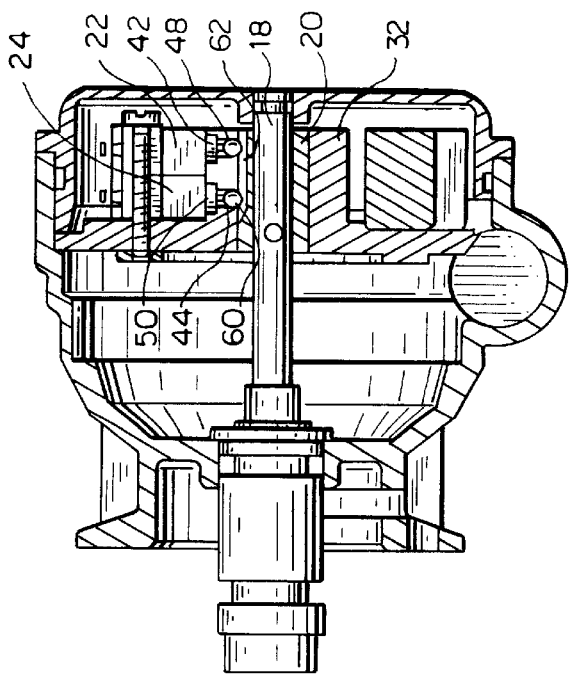
FIG. 4 is a section along the line IV—IV in FIG. 3.

The actuator 12, a portion of which can be seen in FIGS. 3 and 4, differs from that in FIGS. 1 and 2 in that inside the bores 42, 44, 46 of the sleeve 32 surrounding the portion 20 of the shaft 18, the ball elements 56, 58, 60, are arranged radially displaceable in relation to the shaft 18. The ball elements are indirectly or directly acted upon by a force acting on the operating member 48, 50, or 52 in the direction of the portion 20 of the shaft 18, in order to then rest on the outer surface of the section 20 at the time when no switching process is to be triggered.

A groove 62, V-shaped in cross section, extends in the radial direction of the shaft portion 20, into which the balls 56, 58, or 60, can be pressed as a function of the position of the shaft 18, by means of which the appropriate operating member 48, 50, 52, and therefore the associated switch can again be actuated.

The structure to be seen in FIGS. 3 and 4 is simpler in design in comparison with that of FIGS. 1 and 2 in that a problem-free assembly can result, in particular since the components involved can be inserted into the housing 28 preassembled externally on the intermediate wall 30. Independently thereof, however, a steep characteristic line for actuating the switches can also be achieved with the structure in FIGS. 3 and 4.

We claim:

1. An actuator for generating switching signals comprising:

a shaft rotatably supported in a housing which includes an intermediate wall;

means for rotating the shaft;

at least one signal transmitter having an operable member, said signal transmitter being attached to the intermediate wall; and means for operating said signal transmitter;

said means for operating including a hollow cylindrical sleeve portion forming part of the intermediate wall and including a first recess;

a shaft portion of the shaft surrounded by the sleeve portion, the shaft portion having a second recess, a force biased ball element generating a switching signal when said second recess is brought into a position substantially opposite the first recess by rotation of the shaft.

2. The actuator according to claim 1, wherein said first recess in the cylindrical sleeve portion is a through-bore, said second recess in the shaft portion is a blind bore, and a spring operates to force the ball element to at least partially penetrate into said through-bore; the diameter of the ball element, the penetration into the through-bore defining the characteristic switching line generating a switching signal.

3. The actuator according to claim 2, wherein the signal transmitter is a microswitch, and the means for operating the microswitch includes an operating member which can be pushed by the ball element.

4. The actuator according to claim 3, wherein at least two additional microswitches are arranged on the intermediate wall, peripherally around the sleeve portion, two additional through-bores are provided in the sleeve portion, two additional blind-bores in the shaft portion and two additional biased ball elements.

5. The actuator according to claim 4, wherein at least two of the microswitches are arranged offset from each other by 90° in relation to an axis of the shaft.

6. The actuator according to claim 4, wherein at least two of the blind bores extend parallel into the shaft portion.

7. The actuator according to claim 1, wherein said first recess is a groove, said second recess is a through-bore, said signal transmitter is a microswitch having an operating member causing the ball element to be biased against an outer surface of the shaft portion.

8. The actuator according to claim 7, wherein a switching signal is generated when the groove in the shaft portion is positioned opposite the ball element, enabling the ball element to be pushed into the groove.

9. The actuator according to claim 8, wherein an additional microswitch is present to generate switching signals and where the groove is V-shaped in cross-section.

\* \* \* \* \*